(12) United States Patent
Demir

(10) Patent No.: US 11,186,403 B2
(45) Date of Patent: Nov. 30, 2021

(54) STRETCH-BLOWN PLASTIC CONTAINER WITH A HANDLE REGION MADE INTEGRAL AND METHOD OF PRODUCTION FOR THE PLASTIC CONTAINER

(71) Applicant: ALPLA Werke Alwin Lehner GmbH & Co. KG, Hard (AT)

(72) Inventor: Adem Demir, Lauterach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 16/202,259

(22) Filed: Nov. 28, 2018

(65) Prior Publication Data
US 2019/0092512 A1    Mar. 28, 2019

Related U.S. Application Data

(63) Continuation of application No. PCT/EP2017/061602, filed on May 15, 2017.

(30) Foreign Application Priority Data

Jun. 6, 2016 (CH) ..................................... 00721/16

(51) Int. Cl.
*B65D 23/10* (2006.01)
*B65D 1/02* (2006.01)
(Continued)

(52) U.S. Cl.
CPC ............ *B65D 1/0246* (2013.01); *B29C 49/06* (2013.01); *B29C 49/08* (2013.01);
(Continued)

(58) Field of Classification Search
CPC ..... B29C 2793/0018; B29C 2049/4812; B29L 2031/463; B65D 23/10; B65D 23/102
(Continued)

(56) References Cited

U.S. PATENT DOCUMENTS 4,123,217 A    10/1978 Fischer et al.
8,540,928 B2    9/2013 Etesse et al.
(Continued)

FOREIGN PATENT DOCUMENTS

CN        1452544 A    10/2003
CN        1894082 A    1/2007
(Continued)

OTHER PUBLICATIONS

First Office Action dated May 29, 2020, by the Chinese Patent Office in corresponding Chinese Patent Application No. 201780035000.7, and an English Translation of the Office Action. (14 pages).
(Continued)

*Primary Examiner* — Allan D Stevens
(74) *Attorney, Agent, or Firm* — Buchanan Ingersoll & Rooney PC

(57) ABSTRACT

A stretch-blown plastic container, includes a container body which encloses a filling volume with a container bottom; a container neck which adjoins an opposite end of the container body, having a container opening and an integrated handle region, the handle region being hollow and joined to the filling volume which is enclosed by the container body; and between the handle region and the container body, a through opening recessed and bordered over its entire periphery by wall parts of the container body and of the handle region which have been welded to one another.

8 Claims, 4 Drawing Sheets

(51) Int. Cl.
B29C 49/06 (2006.01)
B29C 49/08 (2006.01)
B29C 49/42 (2006.01)
B29C 49/48 (2006.01)
B29C 49/72 (2006.01)
B29C 65/16 (2006.01)
B29C 65/00 (2006.01)
B29L 31/00 (2006.01)
B29K 67/00 (2006.01)
B29L 31/46 (2006.01)
B29K 101/12 (2006.01)

(52) U.S. Cl.
CPC ...... *B29C 49/4268* (2013.01); *B29C 49/4273* (2013.01); *B29C 49/4802* (2013.01); *B29C 49/72* (2013.01); *B29C 65/16* (2013.01); *B29C 65/1635* (2013.01); *B29C 65/1638* (2013.01); *B29C 65/1651* (2013.01); *B29C 66/0326* (2013.01); *B29C 66/1122* (2013.01); *B29C 66/1312* (2013.01); *B29C 66/3494* (2013.01); *B29C 66/50* (2013.01); *B29C 66/81267* (2013.01); *B29C 66/83221* (2013.01); *B65D 23/10* (2013.01); *B29C 65/1645* (2013.01); *B29C 66/71* (2013.01); *B29C 66/8122* (2013.01); *B29C 66/919* (2013.01); *B29C 66/949* (2013.01); *B29C 2049/4807* (2013.01); *B29C 2049/4812* (2013.01); *B29C 2049/725* (2013.01); *B29C 2793/009* (2013.01); *B29C 2793/0018* (2013.01); *B29K 2067/003* (2013.01); *B29K 2101/12* (2013.01); *B29K 2995/0026* (2013.01); *B29L 2031/463* (2013.01); *B29L 2031/7158* (2013.01)

(58) Field of Classification Search
USPC ........................................................ 264/154
See application file for complete search history.

(56) References Cited

U.S. PATENT DOCUMENTS

| | | | |
|---|---|---|---|
| 8,663,543 | B2 | 3/2014 | Etesse et al. |
| 2004/0245678 | A1 | 12/2004 | Belcher |
| 2006/0177615 | A1 | 8/2006 | Connolly et al. |
| 2006/0186581 | A1 | 8/2006 | Etesse et al. |
| 2007/0145646 | A1 | 6/2007 | Cho |
| 2013/0285295 | A1 | 10/2013 | Etesse et al. |
| 2016/0136867 | A1* | 5/2016 | Mahrle .............. B65D 1/02 220/678 |

FOREIGN PATENT DOCUMENTS

| | | |
|---|---|---|
| CN | 101115607 A | 1/2008 |
| CN | 101115608 A | 1/2008 |
| CN | 201151190 Y | 11/2008 |
| CN | 105480541 A | 4/2016 |
| EP | 1688234 A2 | 8/2006 |
| EP | 1853416 A1 | 11/2007 |
| JP | S 5759725 A | 4/1982 |
| JP | S61-43535 A | 3/1986 |
| JP | S62-142092 A | 6/1987 |
| JP | H08-323845 A | 12/1996 |
| JP | 2008-526579 A | 7/2008 |
| JP | 2008-528342 A | 7/2008 |

OTHER PUBLICATIONS

Notice of Reasons for Refusal issued by the Japanese Patent Office in corresponding Japanese Patent Application No. 2018-563682 dated Jan. 6, 2021 (9 pages including partial English translation).
International Search Report (with English Translation) and Written Opinion issued in International Patent Application No. PCT/EP2017/061602, 14 pages, dated Aug. 16, 2017.
Unknown, "KLar-KLar-Schweißen ohne Additive—Plastverarbeiter. de", URL:http//www.plastverarbeiter.de/52063/klar-klar-schweissen-ohne-additive/, 2 pages, Jun. 22, 2015.
Klein, Laserstrahlschweißen transparenter und farbiger Kunststoffe—Innovatives Verfahren ermöglicht transparente Verbindung, www.laser-journal.de, URL:http://onlinelibrary.wiley.com/doi/10.1002/latj.200790176/pdf, pp. 41-44, Sep. 1, 2007.

* cited by examiner

STRETCH-BLOWN PLASTIC CONTAINER WITH A HANDLE REGION MADE INTEGRAL AND METHOD OF PRODUCTION FOR THE PLASTIC CONTAINER

RELATED APPLICATION

This application claims priority as a continuation application under 35 U.S.C. § 120 to PCT/EP2017/061602, which was filed as an International Application on May 15, 2017 designating the U.S., and which claims priority to Swiss Application 00721/16 filed in Switzerland on Jun. 6, 2016. The entire contents of these applications are hereby incorporated by reference in their entireties.

FIELD

The present disclosure relates to a stretch-blown plastic container, for example a transparent plastic bottle, with an integrated handle region. The disclosure also relates to a method for producing such a plastic container.

BACKGROUND INFORMATION

Known tinplate or nonferrous sheet, glass or even ceramic containers are being increasingly replaced by plastic containers. Plastic containers are used for example in packaging of fluid substances for applications in the household, in agriculture, industry and commerce, etc. The low weight and lower costs certainly play a not inconsiderable role in this substitution. The use of recyclable plastic materials and the altogether more favorable overall energy balance in their manufacture also contribute to the promotion of the acceptance of plastic containers among consumers.

Various methods are known for the manufacture of plastic containers, such as plastic bottles, whose use not least also depends on the plastics used. Plastic containers can be produced in a blow mold method, in which the container, for example a plastic bottle, is inflated into its final form by overpressure in a blow mold. Different method techniques are distinguished in blow molding, such as the extrusion blowing method, injection blowing and the injection stretch blowing method.

In the extrusion blowing method a single-layer or multi-layer plastic tube is extruded hot, placed in a blow mold and inflated into a plastic container via a blowing mandrel which has been moved into the mold cavity. The injection blowing method is a combination of injection molding and blow molding. Here a preform is produced first in an injection molding method in an injection mold. The preform is removed from the injection mold, optionally conditioned and placed in the mold cavity of a blow mold in which it is ultimately inflated with overpressure according to the shape dictated by the mold cavity. In the injection stretch blowing method the preform which has been placed in the mold cavity in the blowing process is additionally stretched with a stretching mandrel. The preform can then be inflated following its manufacture in the injection molding method. In alternative production methods, the preforms can also be further processed in space and/or in time separately from production of the preform. The preforms can also be produced in a flow molding method or even in an extrusion blowing method.

The first plastic containers with an integrated handle region were produced in an extrusion blowing method from polyethylene (PE). Polyethylene could be altogether easily processed and made it possible to produce an integrated handle region by forming and welding. However, PE plastic containers are not transparent. Therefore PE was very soon replaced by polyvinyl chloride (PVC) as the starting material which made it possible to produce transparent plastic containers with an integrated handle region.

PVC does have a good welding capacity, but can be relatively difficult to process in different blow molding methods. Ecological considerations also militate against an overly great use of PVC as a raw material for transparent plastic containers. Many alternative plastics which do have the desired transparency are precluded for reasons of costs, due to their relatively difficult processing capacity and due to their overly low mechanical strengths, for example in the drop test, as materials for plastic containers with integrated handle regions.

A raw material which is often used for the manufacture of transparent plastic containers in the stretch blowing method is polyethylene terephthalate (PET). Due to the high stretching which can be achieved in the stretch-blowing method, PET has very good mechanical strength values. For example, a total stretching factor of up to 20 is achieved in the stretch blowing method of PET. This contrasts for example with a total stretching factor of generally less than 5 for example in polyolefins such as polyethylene (PE) or polypropylene (PP) which have been processed in an extrusion blowing method. Stretch-blown plastic containers, such as those of PET, due to the higher total stretching factor have distinctly greater mechanical strength values compared to extrusion-blown plastic containers. This and the cost-favorable process execution with PET and comparable plastics, for example PEF, make the stretch blowing method very attractive in particular also for the production of plastic containers with an integrated handle region.

JP 61 043535 A discloses a stretch-blowing method in which the handle regions are made by shaping within the blow mold. In doing so, wall regions opposite one another on the container body are pressed together by plungers which can be extended within the blow mold after the container body has been stretch-blown into its final shape. The handle regions which have been made in this way form handle depressions on both sides of the plastic container. In any case it has been shown that reliable handling of these bottles with a handle region made as handle depressions is not always possible. Therefore bottles produced from PET with handle depressions have not been able to prevail on the market.

SUMMARY

A stretch-blown plastic container is disclosed, comprising: a container body which encloses a filling volume with a container bottom; a container neck which adjoins an opposite end of the container body, having a container opening and an integrated handle region, the handle region being hollow and joined to the filling volume which is enclosed by the container body; and between the handle region and the container body, a through opening recessed and bordered over its entire periphery by wall parts of the container body and of the handle region which have been welded to one another.

A method for producing a plastic container is also disclosed having a container body which encloses a filling volume with a container bottom; a container neck which adjoins an opposite end of the container body, having a container opening and an integrated handle region, the handle region being hollow and joined to the filling volume which is enclosed by the container body; and between the handle region and the container body, a through opening recessed and bordered over its entire periphery by wall parts of the container body and of the handle region which have been welded to one another; the method comprising: axially and radially stretching tubular preform into a plastic container by a stretch blowing in a blow mold; during stretching bringing two opposing wall regions of the container body close together by plungers which are extendable out of the blow mold to prepare an integrated handle region; afterwards removing a stretch-blown plastic container from the mold for transport to a welding station; welding the wall regions which have been brought together to one another with formation of a weld; and separating and removing one wall section enclosed by the weld from the container body with formation of a through opening.

BRIEF DESCRIPTION OF THE DRAWINGS

Other advantages and features will become apparent from the following description of exemplary embodiments with reference to the schematics which are not to scale, wherein like elements are represented by like reference numerals, and wherein.

DETAILED DESCRIPTION

Figure 1:
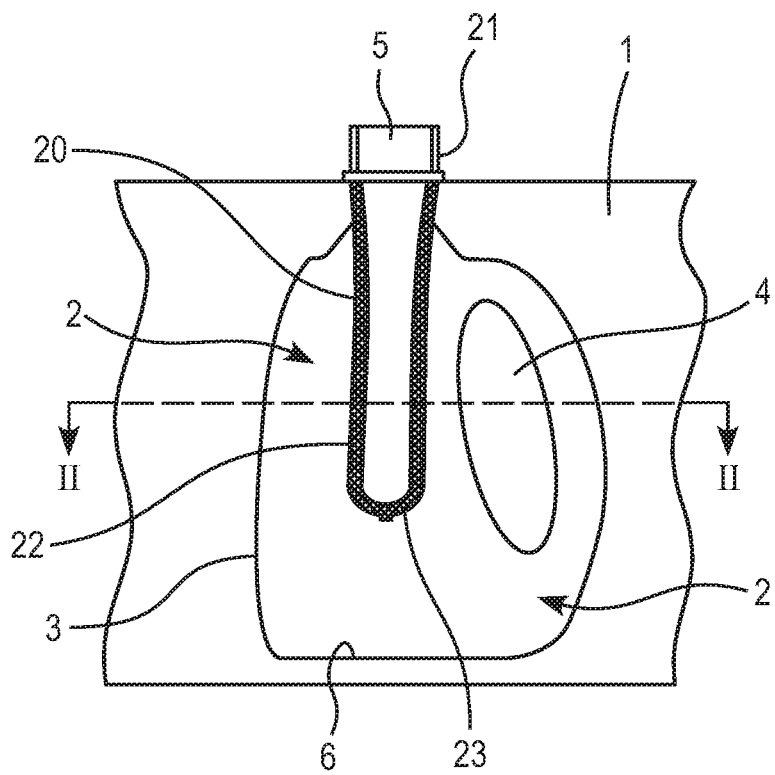
FIG. 1 shows an exemplary blow mold cavity with an inserted preform.

As disclosed herein, a plastic container, for example a plastic bottle can be formed, with an integrated handle region that can be reliably gripped for transport. In doing so the plastic container can be produced in a largely standardized stretch-blowing method. Exemplary embodiments can avoid complex modifications of executing the method. The production method can allow short cycle times and can be economically carried out.

A stretch-blown plastic container is disclosed which has a container body which encloses a filling volume with a container bottom, has a container neck which adjoins an opposite longitudinal end of the container body with a container opening and has a handle region which is integrated. The handle region can be made hollow and joined to the filling volume which is enclosed by the container body. Between the handle region and the container body a through opening is recessed and is bordered over its entire circumference by wall parts of the container body and of the handle region which have been welded to one another.

The handle region of the plastic container can be made hollow and joined to the filling volume. In this way an added substance can also expand into the handle region. The hollow handle region thus contributes to the filling volume. In doing so its dimensioning with a surface area which is limited by an inside wall of the handle region at its narrowest point of for example roughly 5 $mm^2$ to roughly 400 $mm^2$ imparts sufficient strength to it.

The handle region here can have any geometrical shape. Geometrical shapes which are rounded at least in the region of the passage, for example made round oval or elliptical, have proven to be convenient for a user for gripping. The recessed through opening facilitates gripping and holding of the plastic container. In this way plastic containers with a capacity from for example, roughly 0.5 (e.g., ±10%) to roughly 20 liters (e.g., ±10%) and more can be grasped and reliably held and manipulated.

The plastic container can be produced in a largely known stretch blowing method from a tube-like preform which has been prepared beforehand conventionally in an injection molding method. The production of plastic containers in a stretch blowing method from the conditioned preforms leads to high stretching of the plastic material used and can ensure very good mechanical strengths values, for example with respect to compression resistance and dropping resistance. The production method in a stretch blowing method from a preform can be tried on a plastic container which has been fully blown. For example the injection point of the preform can be recognized on the container bottom. The container neck which is provided with the container opening also can have a greater wall thickness and can be unstretched since it is located outside the blow mold cavity in the stretch blowing method.

In one exemplary version of the plastic container the wall parts which have been welded together and which border the through opening can form a weld whose width is for example, 100 µm to 5 mm.

Another exemplary version of the plastic container can provide for the wall parts which have been welded together to be joined to one another in a laser irradiation welding method. In one such known laser welding method, welds of a width from for example, 3 mm to 5 mm can be achieved in known fashion.

In an exemplary alternative version of the plastic container, a clear-clear welding method can be used as the laser welding method for the welding of the wall parts which border the through opening. Here the wall parts have a total stretching factor greater than for example, 3. On the finished plastic container this can be accomplished using the very narrow weld width from for example, 100 µm to 3 mm. Here the weld can have a very small fluctuation variation of up to only 10 µm (e.g., ±10%).

Clear-clear laser welding allows very precise welding of plastic materials which are transparent to the laser radiation used without the addition of conditioners. Thus the wall regions which border the through opening can be welded to one another. While the upper joint partner is irradiated in known laser welding and the heat is produced only in the underlying lower joint partner, in clear-clear welding the heat is added to the entire irradiated body. Precisely focusing the incident laser light on the welding plane melts the materials of the two joint partners onto one another. Heat can be added in doing so by exciting water molecules in the plastic to oscillation. Additives for conversion of the incident energy into heat can therefore be omitted. This simplifies and accelerates the laser welding process.

In an exemplary version of the plastic container disclosed herein, the container body can have a filling volume from for example, 0.5 to 20 liters, preferably for example, 0.7 to 10 liters and especially preferably for example, 0.9 to 3 liters. Plastic containers with such volumes are likewise popular in the food sector, for example for edible oils, as well as for the storage of household cleaning and care agents, detergents or also mineral oils and the like.

Another version of the plastic container can provide for the container body to be made with one or several layers and to have a percentage by mass of for example, at least 80% which includes (e.g., consists of) a primary plastic component from the group comprised of (e.g., consisting of) polyethylene terephthalate, polyethylene naphthalate, polyactide, polyethylene furanoate, polypropylene furanoate, their copolymers and mixtures of these plastics. In the literature, polypropylene furanoate is often also called polytrimethylene furanoate. The glass transition temperature of the cited plastics here is less than for example, 150° C. and greater than for example, 54° C. The cited plastics have great similarities with respect to their processability. They allow high degrees of stretching and can be processed into transparent plastic containers with high strength. Where the plastics are stretched, they can contract by more than 20% when heated to a temperature greater than 150° C. This can be measured by a 10 mm wide tensile bar being fabricated from the contour to be welded and this tensile bar being heated for 20 seconds to greater than 150° C. Furthermore the cited plastics can also be reliably joined using the cited laser welding method in order to be able to produce an integrated handle region with a though opening.

In another exemplary version, the body of the plastic container can be made transparent at least in regions. The transparent execution of the container body enables the fill level to be directly monitored.

According to another exemplary embodiment, an edge which borders the through opening is made as a round bead which is free of burrs. After welding of the wall the wall sections which are bordered by the weld and which essentially adjoin one another are removed to form the through opening. This can be done with a $CO_2$ laser which can thermally remove the unneeded wall section and produce a rounded bead free of burrs on the cut edge in one working step. This can be perceived as convenient by the user whose hand reaches through the through opening. The wall parts can also be removed in a form such that in the resulting through opening at least one projection is formed on its edge which is set up to accommodate an insertion part in the through opening. The insertion part can be made for example as a metering cup with which the contents of the container can be removed in a metered manner.

In an exemplary method for producing a plastic container according to an exemplary version of the disclosure, a preform which is made tubular is stretched axially and radially into a plastic container in a stretch blowing method in a blow mold. During stretching two opposing wall regions of the container body are brought together by means such as plungers which can be extended out of the blow mold to prepare an integrated handle region. Afterwards the stretch-blown plastic container is removed from the mold and transported to a welding station in which the wall regions which have been brought together are welded to one another with the formation of a weld. The wall section enclosed by the weld is then separated and removed from the container body with the formation of a through opening.

In an exemplary method as disclosed, opposing wall regions of the container body can be brought together during the stretching of the preform used. In doing so, a preliminary bubble which has been produced in the initial phase of the stretch blowing method can be deformed. This can ensure that the plastic material is stretched to the desired degree. Afterwards the preliminary bubble can be fully inflated according to the blow mold cavity which has been made smaller around the extended plungers. This can result in a very uniform material distribution so that the fully inflated plastic container has a relatively uniform distribution of the wall thickness also in the regions in which the opposed wall regions are brought together. If necessary or desired, the plungers can also be driven towards one another during the main blowing process in order to further change the outside contour of the container body. The opposing wall regions which have been brought together on the fully blown plastic container form handle depressions which form a preliminary stage for an integrated handle region. After the plastic container is removed from the mold the container is transported to a welding station. There the wall regions which have been brought together in the blow mold are brought into flat contact with one another and are welded to one another along a closed line which borders the handle depressions. The wall section which is enclosed by the weld which has been formed in this way can then be separated and removed with the formation of a through opening. In an exemplary version the wall regions which have been brought together can be welded peripherally onto one another without removing the wall section which is bordered by the weld. Within the container body this can form a zone which is not filled by the contents of the container. This can produce a visual effect, for example, when the contents of the container are colored.

While it is not absolutely necessary, in an exemplary version of the method it can be provided that the wall regions which have been brought together are already in flat contact with one another in the blow mold. In this way maximum stretching can be achieved in the regions of the container body which form the handle depressions. The adjoining wall regions can already have a certain adhesion to one another; this can facilitate the subsequent welding process.

In another exemplary version of the method, the wall regions which have been brought together can be joined to one another in a bonded manner in a laser welding method after the removal of the plastic container from the mold. Laser welding can take place in time and/or place separately from the stretch blowing method. This will mean that the wall regions which have been brought together need not be welded to one another directly after removal from the mold in a welding station. It can also be provided that the fabricated plastic containers are stored for the interim before they are transported on to a welding station.

In another exemplary version of the method, the wall regions which have been brought together can be bonded to one another in a clear-clear welding method. Clear-clear laser welding allows very precise welding of plastic materials which are transparent to the laser radiation used without the addition of conditioners. While in known laser welding the upper joint partner is irradiated and the heat is generated only in the underlying lower joint partner, in clear-clear welding the heat is delivered into the entire irradiated body. Precisely focusing the incident laser light onto the welding plane melts the materials of the two joint partners onto one another. Heat can be added in doing so by the excitation of water molecules in the plastic to oscillation. Additives for conversion of the incident energy into heat can therefore be omitted so that admixture of additives which are absorbent relative to the laser light used can be unnecessary. This simplifies and accelerates the laser welding process.

An exemplary version of the method of laser welding can provide for the wall regions which have been brought together to be compressed by means such as two opposing plungers, at least one of the two plungers being transparent relative to the laser radiation used for the laser welding. Even if the two wall regions which have been brought together are already in contact or are more or less adhering well to one another after the stretch blowing method, compressing the wall parts against one another provides for a defined position of the wall parts. The two plungers therefore fix the two wall regions and can moreover prevent contraction and deformation of the regions to be welded, in particular during the welding process. In addition, the plungers can cool the region to be welded such that during the welding process or after the welding process the weld is stable, therefore does not contract or break. In this way the weld can be prepared exactly and reproducibly from container to container. Here welds can be achieved which lie within a tolerance of 10 microns relative to the predetermined weld line.

In another exemplary version of the method, the plungers used for compressing the wall regions which are to be welded to one another can include at least one plunger which can include (e.g., consist of) a material such as for example glass, quartz glass or acrylic glass which is transparent to the laser radiation used. The laser energy is emitted into the joint partners by this plunger. When using the clear-clear welding method the two plungers can also include (e.g., consist of) a material which is permeable to the laser light used.

In another exemplary version of the method which can be used alternatively or in addition to compression of the wall regions which are to be welded to one another, the wall regions which have been brought together can be held in flat contact with one another by a negative pressure which has been generated in the container body. The negative pressure can be produced via the container opening by a suction head being seated on it.

The welding of the wall regions which have been brought together can proceed in a known laser welding method as in clear-clear welding of opposing sides. When using plungers for compressing the wall regions in the welding station the two plungers are transparent to the delivered laser radiation and can consist of glass, quartz glass or acrylic glass.

Another version of the method can provide for the weld which borders the through opening over its entire periphery to be de-burred and/or rounded.

Deburring or rounding can be necessary or desired o increase the ease of holding for a user of the plastic container.

Deburring and/or rounding can be take place at the same time with or following the removal of the wall section which is surrounded by the weld. For example, for this purpose a $CO_2$ laser can be used which separates the wall section and parallel to it on the edge bordering the through opening forms a rounded welding bead free of burrs.

FIG. 1 shows an axial section of an exemplary preform 20 which has been inserted into a blow mold cavity 2 of a blow mold 1. The sectional plane runs along the junction plane of two blow mold halves of the blow mold 1. One preform neck 21 with one opening and one tubular preform 20 which has a preform body 22 closed with a preform bottom 23 consist of a thermoplastic. For example, at least one of the preform bodies 22 is made with one or more layers and has a percentage by mass of at least 80% of a primary plastic component from the group comprised of (e.g., consisting of) polyethylene terephthalate, polyactide, polyethylene naphthalate, polyethylene furanoate, polypropylene furanoate, their copolymers and mixtures of these plastics. The preform 20 can be produced in known fashion by an injection molding method. But it can also be produced in a flow molding method or in an extrusion blowing method. The blow mold 1 is a component of a stretch blowing device in which the preform 20 is inflated into a plastic container according to the mold cavity 2. The preform neck 21 is located outside the mold cavity 2 and is ordinarily no longer changed in the stretch blowing method.

The preform 20 is supported on a mouth 5 of the blow mold cavity 2 and extends axially in the direction of a bottom 6 of the blow mold cavity 2. The blow mold cavity 2 is bordered by one blow mold wall 3 and the blow mold bottom 6. In a section of the blow mold wall 3 near the edge one wall section 4 projects into the interior of the blow mold cavity 2. The inner contour of the blow mold cavity 2 essentially dictates the later shape of the plastic container which is to be produced in the stretch blowing method. The preform body 22 is shaped into the body of the plastic container by inflation and axial stretching with a stretch blowing mandrel which has been entered through the opening in the preform neck 21. The preform neck 21 remains essentially unchanged in the stretch blowing method and forms the neck of the plastic container.

Figure 2:
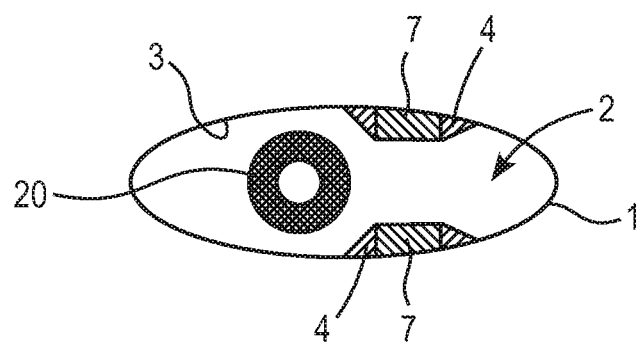
FIG. 2 shows a cross section of the exemplary blow mold cavity according to profile line II-II in FIG. 1.

The cross section in FIG. 2 shows the exemplary preform 20 which is made for example rotationally symmetrical within the blow mold cavity 2 of the blow mold 1 before the start of the blowing and stretching process. The blow mold cavity 2 for example has two opposing wall sections 4 which project relative to the blow mold wall 3. The two wall sections 4 each have one central region which is made as a movable plunger 7. By running the plungers 7 into the blow mold cavity 2 its inner contour can be changed. The protruding wall sections 4 are stretched out of the axial center region of the blow mold cavity 2 and leave a central, essentially cylindrical section free for the stretch blowing mandrel.

Figure 3:
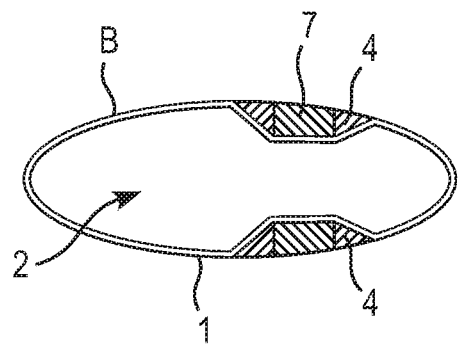
FIG. 3 shows a cross section of the exemplary blow mold cavity with a preliminary bubble stretch-blown from the preform.

FIG. 3 shows a preliminary bubble B which has been produced from the preform 20, in particular the preform body 21, in a so-called preliminary blowing process. The preliminary bubble B largely follows the inner contour of the blow mold cavity 2 with the plungers 7 in the initial position.

Figure 4:
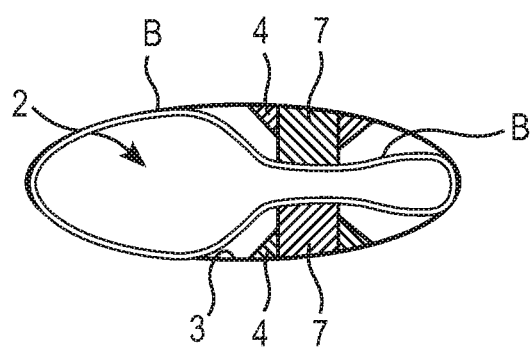
FIG. 4 shows a cross section of the exemplary blow mold cavity and of the preliminary bubble with deformed side walls.

FIG. 4 shows the blow mold cavity 2 of the blow mold 1 at the end of the preliminary blowing process. The plungers 7 in the central regions of the opposing wall regions 4 are introduced into the interior of the blow mold cavity 2 to the desired extent. In doing so the preliminary bubble B is deformed and the plastic material is stretched. The deformations of the side walls of the preliminary bubble B are located on those regions on which an integrated handle region is to be made.

Figure 5:
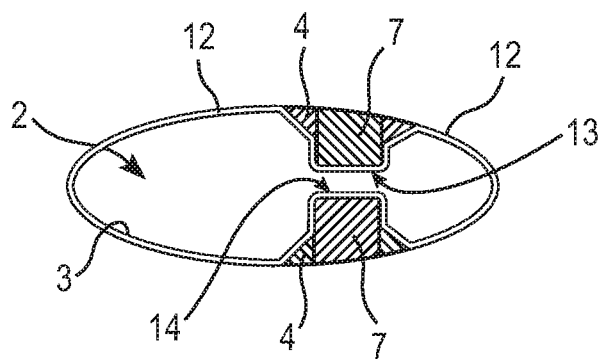
FIG. 5 shows a cross section of the exemplary blow mold cavity and of a completely inflated plastic container.

FIG. 5 shows a cross section of the blow mold cavity 2 and a completely stretch-blown plastic container before its removal from the mold. In particular the Figure shows a cross section of the container body 12 with wall regions 13, 14 which have been brought together. The wall regions 13, 14 correspond to the deformations in the side walls of the preliminary bubble (FIG. 4) and are located in a region of the container body 12 near the edge and form handle depressions. The wall regions 13, 14 which form the handle depressions follow the outline of the sections 4 which project relative to the blow mold wall 3 and the plungers 7 which have been run into the blow mold cavity 2. The feed movement of the plungers 7 can be limited for example such that the wall regions 13, 14 which have been brought together still have a distance from one another.

In an exemplary alternative execution of the method the plungers 7 which have been run into the mold cavity 2 of the blow mold 1 are also fed towards one another to such an extent that the wall regions 13, 14 are clamped between the plungers 7 and come into flat contact with one another. Optionally in doing so the wall parts 13, 14 can be a least partially bonded to one another in the still hot state of the preliminary bubble at the contact sites.

Figure 6:
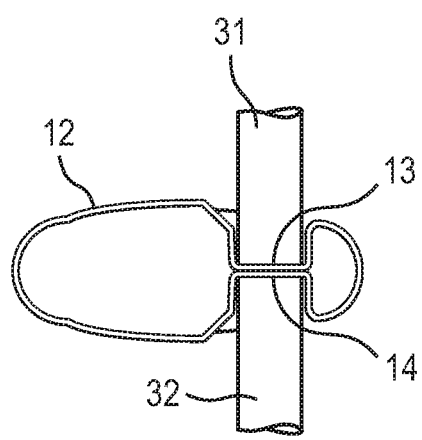
FIG. 6 shows a cross section of the exemplary plastic container in a welding station.

FIG. 6 shows a schematic cross section of the exemplary container body 12 of a stretch-blown plastic container which has been removed from the blow mold. In one welding station the wall regions 13, 14 which have been brought together in a stretch blowing method are compressed using two opposing plungers 31, 32 which can be fed towards one another. FIG. 6 shows a state briefly prior to the compressed wall regions 13, 14 coming into flat contact with one another. Alternatively or in addition the wall regions 13, 14 can be caused to lie flat on one another in the welding station also by producing a negative pressure within the container body 12. For example, to do this a suction head can be seated on the opening of the container neck. Even in plastic containers whose wall regions 13, 14 have already been brought into flat contact with one another during the stretch blowing method does compression of the wall regions with the plungers 31, 32 take place in the welding station. This ensures flat contact and in any case the wall regions can be brought into a defined and reproducible position with reference to one another.

Figure 7:
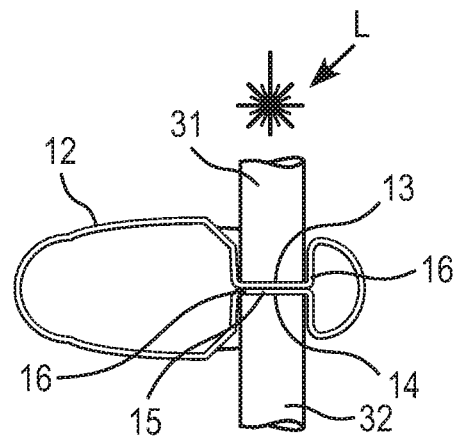
FIG. 7 shows a cross section of the exemplary plastic container during laser welding.

FIG. 7 shows the container body 12 with the wall regions 13, 14 which have been compressed via the plungers 31, 32. The forcing of the wall regions 13, 14 onto one another with the plungers 31, 32 causes the wall regions 13, 14 which are to be welded to remain stable during welding and not be distorted or deform. Moreover the plungers 31, 32 cool and support the process such that the wall regions 13, 14 to be welded are not distorted. The wall regions 13, 14 are stretched such that when heated for 20 seconds to more than 150° C. they contract by more than 20%. The wall parts 13, 14 lying flat on one another are then welded to one another along one edge of their contact surface. In doing so a closed weld 16 is produced and encloses a wall section 15 which is formed by the two wall regions 13, 14. In another working step then the wall section 15 enclosed by the weld 16 is then separated and removed in order to produce a through opening 17.

The adjoining wall regions 13, 14 can be welded by known laser irradiation welding. The weld 16 produced in doing so can have a width which is for example, 3 mm to 5 mm or lesser or greater. In an exemplary version of the method the compressed wall regions 13, 14 can be positively joined to one another by a clear-clear welding method. In this version of laser welding the added heat is focused precisely on the weld plane and the partners which are to be joined to one another can be melted onto one another in a dedicated manner in the welding plane. The heat can be supplied by the excitation of water molecules in the plastic to oscillation. Additives for conversion of the incident energy into heat can be omitted in this welding method.

At least one of the two plungers 31, 32 with which the wall regions 13, 14 are being compressed is transparent to the laser radiation L which is used for laser welding so that the laser radiation L can be focused onto the welding plane by this plunger. In an exemplary alternative execution of the method the laser welding can also proceed from the two sides of the compressed wall regions 13, 14. It goes without saying that in this case the two plungers 31, 32 include (e.g., consist of) a material which is transparent to the incident laser radiation. For example the at least one or both plungers 31, 32 include (e.g., consist of) glass, quartz glass or acrylic glass or any combination thereof, or other suitable material.

Figure 8:
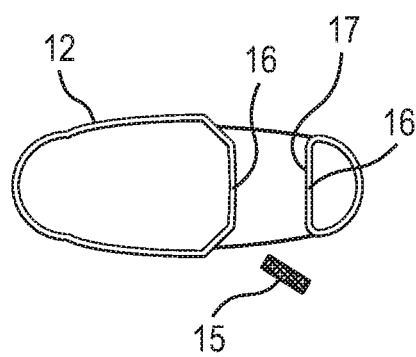
FIG. 8 shows a cross section of the exemplary plastic container with excised wall part.

FIG. 8 schematically shows exemplary separation and removal of the wall section 15 which is enclosed by the weld 16. Separating and removing the wall section 15 produces the through opening 17. The weld 16 which borders the through opening 17 over its entire periphery can also still be deburred and/or rounded. Deburring and/or rounding can take place at the same time with or following the removal of the wall section 15 enclosed by the weld 16. For example, an infrared radiator matched to the radius of the handle region can be used for this purpose.

Figure 9:
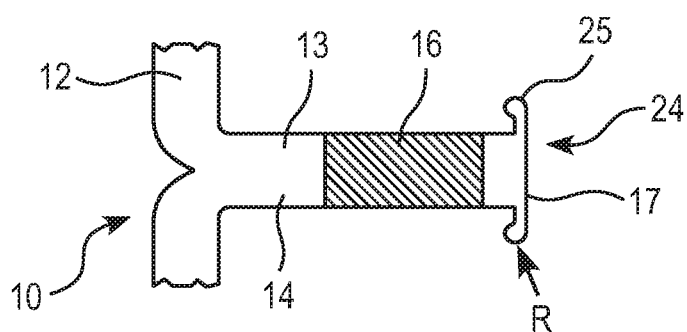
FIG. 9 shows an enlarged cross section through one edge which borders a through opening.

FIG. 9 shows an enlarged cross section through the edge bordering the through opening 17. The wall section 15 has been thermally separated by means, for example, of a $CO_2$ laser. By thermal cutting the wall section 15 is separated spaced apart from the weld 16 in order to keep the thermal load on the weld 16 as small as possible. Parallel to the separation a burr-free bead 24 forms on the edge. When the bead 24 is formed part of the material is displaced beyond each of the wall regions 13, 14 and forms a partial region 25. Each partial region 25 on one edge forms a radius R with roughly, for example, in this embodiment of a container, 0.25 mm or lesser or greater (e.g., ±10%). The burr-free bead 24 which is wider that the material thickness of the two wall regions 13, 14, in concert with rounding of the partial regions 25, imparts a pleasant feeling in handling to the hand of a user reaching through the through opening 17.

Figure 10:
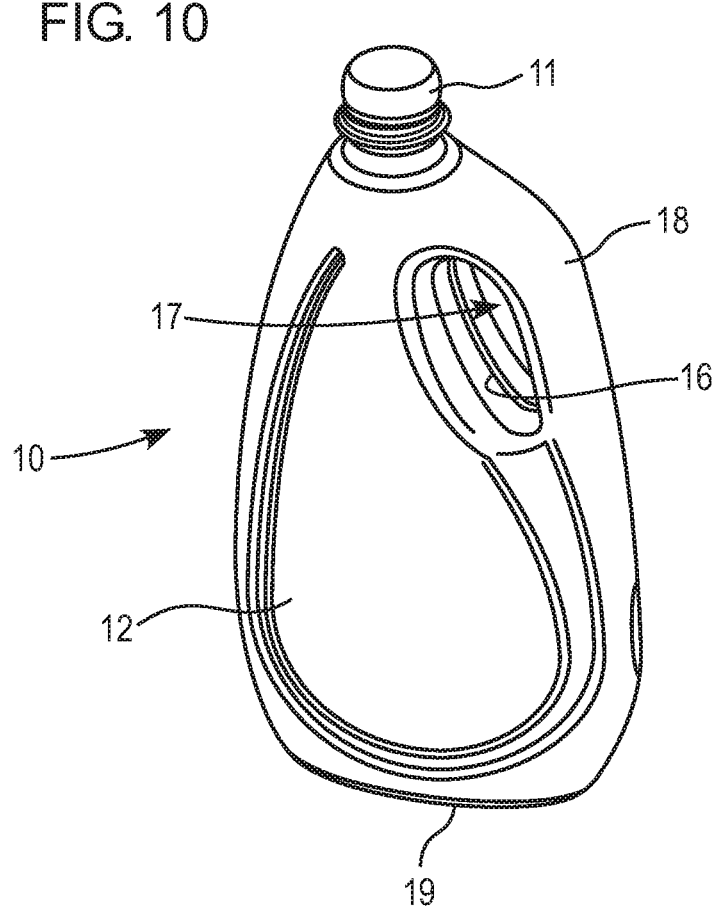
FIG. 10 shows a perspective of an exemplary plastic container which has been stretch-blown according to an exemplary method disclosed herein.

FIG. 10 shows a perspective view of an exemplary plastic container 10 which has been stretch-blown according to the method as disclosed with an integrated handle region 18. The plastic container 10 has a container neck 11 with a container opening which corresponds essentially to the neck of the preform from which the plastic container 10 has been stretch-blown. The container neck 11 is adjoined by the container body 12 closed by a container bottom 19, with the integrated handle region 18. The handle region 18 encloses the through opening 17 which is enclosed by the weld 16 over its entire periphery and has been produced by removing the wall section 15 (FIG. 7 and FIG. 8).

The handle region 18 of the plastic container 10 can be made hollow and connected to the remaining filling volume enclosed by the container body 12. In this way a contained substance can also expand into the handle region 18. The hollow handle region 18 thus contributes to the filling volume. In doing so its dimensioning with a surface area from roughly, for example, in this embodiment of a container 5 $mm^2$ to roughly 400 $mm^2$ or lesser or greater (e.g., ±10%) which is limited by an inside wall of the handle region imparts sufficient strength to it. At its narrowest point the handle region surrounds an area of or example, in this embodiment of a container 60 $mm^2$ or lesser or greater (e.g., ±10%). The recessed through opening 17 facilitates grasping and holding of the plastic container 10. In this way plastic containers with an exemplary greater capacity from 2 to 10 liters and more can be easily grasped and reliably held and handled. The plastic container 10 is for example, made transparent; this enables direct monitoring of the fill level. The plastic container 10 can be produced in a largely known stretch blow molding method from a tubular preform which has been manufactured in known fashion beforehand in for example, an injection molding method. Production in an injection molding method can lead to high stretching of the plastic material used and allow the production of plastic containers 10 which have very good mechanical strength values, for example with respect to compression resistance and dropping resistance.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A stretch-blown plastic container, comprising:
   a container body which encloses a filling volume, the container body including a container bottom at a first end;
   a container neck which adjoins the container body at a second end of the container body which is opposite the first end, the container neck having a container opening; and
   an integrated handle region, the handle region being hollow and joined to the filling volume which is enclosed by the container body,
   wherein a through opening is recessed between the handle region and the container body, said through opening being bordered by wall parts of the container body which have been welded to one another and by wall parts of the handle region which have been welded to one another such that said through opening is bordered over its entire periphery, wherein the respective wall parts of the container body and the respective wall parts of the handle region have a laser weld seam between them, wherein spaced apart from the weld seam, the through opening is bordered by an edge, the edge being formed by thermal cutting as a rounded bead free of burrs.

2. The plastic container as claimed in claim 1, wherein the laser weld is formed using a clear-clear weld method.

3. The plastic container as claimed in claim 1, wherein the container body is configured with a fill volume from 0.5 to 20 liters.

4. The plastic container as claimed in claim 1, wherein the container body comprises:
   one or several layers, and has a percentage by mass of at least 80% which consists of a primary plastic component selected from the group consisting of polyethylene terephthalate, polyactide, polyethylene naphthalate, polyethylene furanoate, polypropylene furanoate, their copolymers and mixtures of these plastics.

5. The plastic container as claimed in claim 1, comprising: the container body is made transparent at least partially.

6. The plastic container as claimed in claim 1, wherein the container body is configured with a fill volume from 0.7 to 10 liters.

7. The plastic container as claimed in claim 1, wherein the container body is configured with a fill volume from 0.9 to 3 liters.

8. The plastic container as claimed in claim 1, wherein the rounded bead is wider than the material thickness of the wall parts of the container body which have been welded together and wider than the material thickness of the wall parts of the handle region which have been welded together.

* * * * *